INVENTOR
VITIE J. STAKUN 3,398,284
SCAN TECHNIQUE FOR VIDICON TRACKER
Vitie J. Stakun, Pepperell, Mass., assignor, by mesne assignments, to the United States of America as represented by the Secretary of the Navy
Filed Feb. 25, 1965, Ser. No. 435,389
4 Claims. (Cl. 250—203)

The present invention relates to a system for tracking a target emanating infrared energy and more particularly to a system for scanning the image of the target on a vidicon tracker to resolve the position of the target into range and azimuth or elevation.

An object of the present invention is to provide the apparatus for deriving the polar coordinates of an infrared target for use in an intercepter system.

Another object of the present invention is to track the image of a target passing through the optical field of view of a vidicon.

A further object of the present invention is to acquire and track point targets using a low frequency double circular scan.

Figure 1:
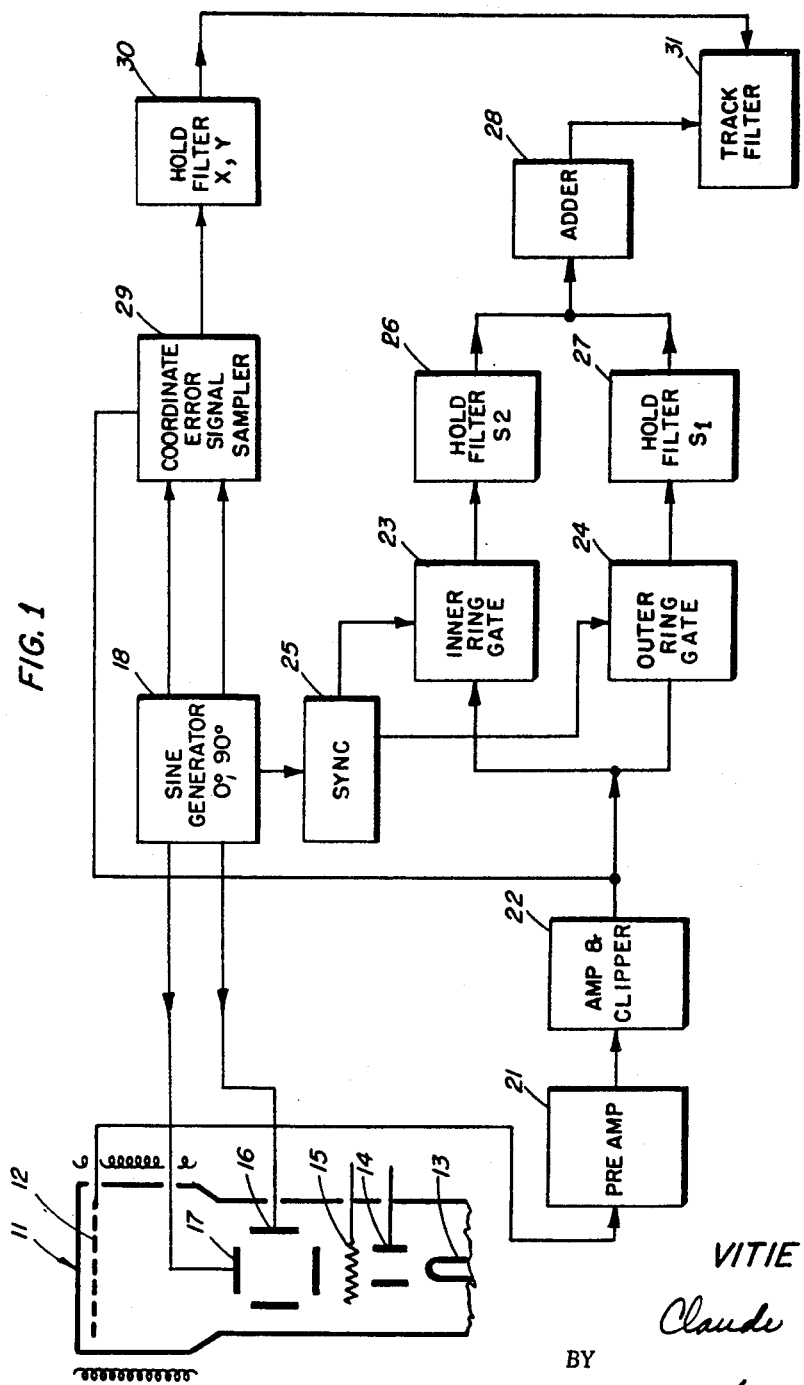
Figure 3:
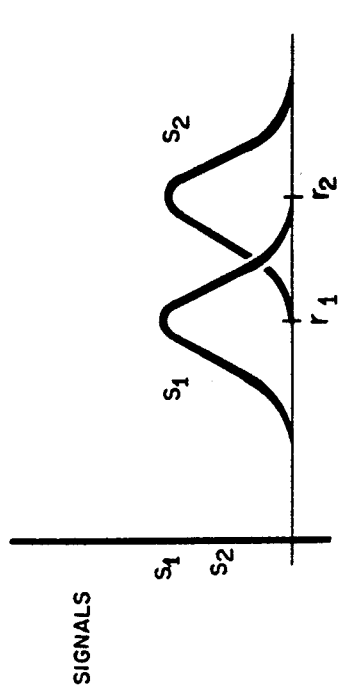
Figure 4:
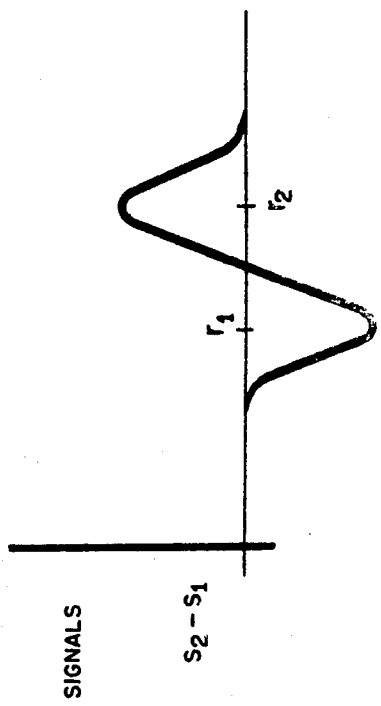
Figure 2:
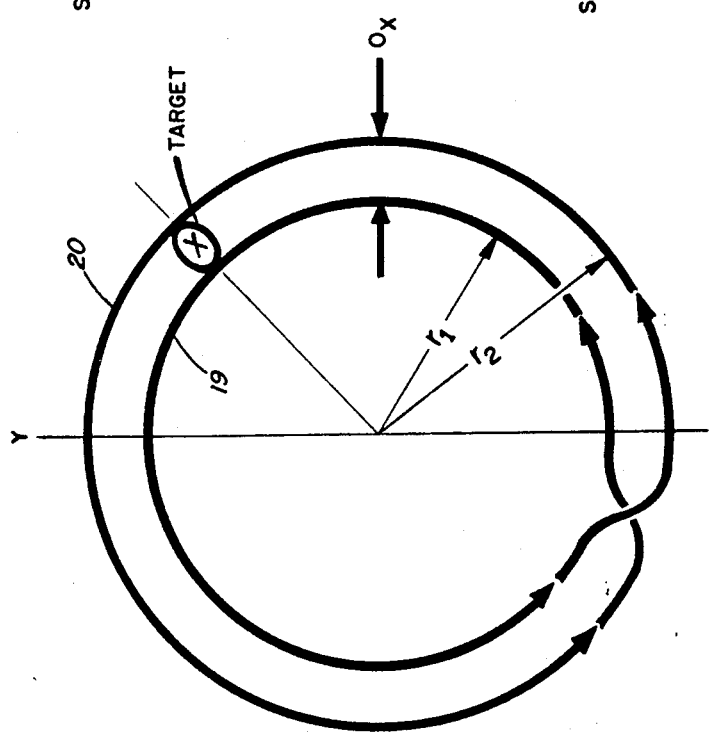

Other objects, advantages and novel features of the present invention will become apparent from the following detailed description of the invention when considered in conjunction with the accompanying drawings wherein:

FIG. 1 is a block diagram of the present invention;
FIG. 2 illustrates the geometry of the double circular scan of the present invention;
FIGS. 3 and 4 show graphs explaining the operation of block diagram of FIG. 1 with reference to FIG. 2.

Referring now to the drawings, a scanning circuit for a vidicon tracker is shown. The vidicon 11 of the tracker is a well-known low velocity electron beam scanning tube having a photoconductive plate 12 receiving infrared energy within the field of view of the tube. The received infrared energy illuminates the plate which causes increased conductivity of the plate. The vidicon has elements for an electron gun; namely, a cathode 13, anode 14 and control electrode 15 which produces a narrow beam of low velocity electrons. The deflection means for the electron beam are the well-known horizontal and vertical deflecting plates 16 and 17. The scanning of the photoconductive plate 12 by the electron beam deposits electrons on the plate in proportion to the intensity of the infrared image and restores the plate 12 to its original potential before reception of the image. The change of potential on the plate is detected which provides an electrical signal representing the reception of an image on the plate.

In FIG. 1, the horizontal and vertical deflecting plates 16 and 17 are connected to a sine generator 18 which applies two sets of pairs of sinusoidal voltages to each pair of deflecting plates. Each pair of voltages is 90° out of phase with one another and is applied respectively to the horizontal and vertical plates to produce a circular scan of the electron beam. Each set of voltages has a different amplitude. The application of the two alternating sets of voltages to the deflecting plates causes the deflected electron beam to sweep a double circular scan having an "inner" ring 19 and an "outer" ring 20, as shown in FIG. 2.

When a target is within the field of view of the vidicon, the photoconductive plate receives the infrared image of the target. The scanning of a received image on the plate by the electron beam changes the potential on the plate which is detected as a vidicon output signal. The vidicon output signal is amplified and clipped in the preamplifier 21, and the amplifier and clipper 22 to reject the low frequency shading signal on the plate.

In order to understand the operation of the invention, the circles or rings as shown on the geometry of FIG. 2 are successively scanned. In order to compare the vidicon output signal from each ring, these signals have to be stored. If the electron beam is slightly defocused, the response will vary with target radius, as shown in FIG. 3. The difference between the signals $(S_2-S_1)$ will then vary with target radius, as shown in FIG. 4. Thus, over a limited radius, it is legitimate to express an error signal as $$e\Delta(S_2-S_1)=k(r-r_{\mathrm{m}})$$

where $r$ is the radius of the target, $$r_{\mathrm{m}}=\frac{r_1+r_2}{2}$$

and $k$ is a constant dependent on the magnitude of the signal and the amount of smearing on plate 12 due to target motion. $S_1$ is the outer ring signal and $S_2$ is the inner ring signal.

Referring again to FIG. 1, inner and outer ring gates 23 and 24 are connected to the amplifier and clipper 22. A synch circuit 25 is connected to the sine generator 18 and to each of the ring gates. The sine generator applies a sinusoidal voltage to the synch circuit to develop two distinct synchronizing voltages or synch signals representative of the time of the deflecting voltages for the outer and inner rings of the scan. The amplified vidicon output signal from amplifier and clipper 22 is fed to the inner and outer ring gates. The synch signals from the synch circuit are applied to the gates to sequentially trigger the gates to separate successive vidicon output signals from the double circular scan into an outer ring vidicon output signal and an inner ring vidicon output signal.

A pair of zero order hold filter circuits 26 and 27 are connected respectively to the inner and outer ring gates 23 and 24. The gates feed the synchronized vidicon signals to the zero order hold filter circuits for storing these signals during the successive sweep of the inner and outer rings of the double circular scan. Each hold filter circuit 26 and 27 is coupled to an adder 28, wherein the stored vidicon signals from hold filter circuits are subtracted, the outer ring vidicon signal from the inner ring vidicon signal. The adder puts out a difference signal whose amplitude is an indication of the tracking error of the vidicon tracker.

The sine generator 18 is connected to a coordinate error signal sampler 29 which is coupled to the amplifier and clipper 22 and to a zero order hold filter X, Y 30 being similar to a box-car detector. The coordinate error sampler 29 using the beam deflecting voltages of generator 18 as reference signals in relationship to the vidicon output signal from clipper 22 determines the quadrant position of the image on the photoconductive plate 12. The hold filter 30 retains the signal from coordinate error sampler to determine the position of the image in the X and Y coordinates which can be extracted to give the polar coordinates thereof.

A track filter or output means 31 is connected to both the hold filter 30 and the adder 28 which combines the difference signal from the adder and the signal from the hold filter 30. The track filter smooths the response of the vidicon tracker to these signals whereby the polar coordinate position of the image is known and a null signal from adder 28 is an indication that the image of the target is between the scan of the inner and outer rings. The track filter includes means for adjusting the vidicon tracker to center the image of the target between the scan of the inner and outer rings.

Obviously many modifications and variations of the present invention are possible in the light of the above teachings. It is therefore to be understood that within the scope of the appended claims the invention may be practiced otherwise than as specifically described.

What is claimed is:

1. A system for deriving the polar coordinates of an infrared target as represented by an image on a vidicon photoconductive plate, comprising:

means for generating a double circular scan of the electron beam of the vidicon;

means for detecting an image received by the vidicon when the image is scanned by the electron beam and for deriving a vidicon output signal representing the intensity of said image;

comparison means connected to said detecting means for separating successive vidicon output signals, for retaining the separated vidicon output signals, and for determining a difference output signal between said separated vidicon output signals, said difference output signal being an indication of the amount of radial error of the target, synchronizing means initiated by said generating means for gating said comparison means for effecting the separating of successive vidicon output signals, and coordinate error signal means connected to said generating means and said detecting means for determining the quadrant position of the image and for deriving the azimuth and range of the target.

2. A system for deriving a position of a target as represented by an image on a vidicon photoconductive plate, comprising:

means for generating two sets of deflection voltages wherein voltages of each set are 90° out of phase and between sets have different amplitudes, and for establishing a double circular scan of an electron beam of a vidicon, means for detecting and amplifying an electrical signal representing a received image on the photoconductive plate when the electron beam scans the plate, comparison means connected to said detecting and amplifying means for comparing successive signals from said detecting and amplifying means, synchronizing means initiated by said generating means for sequentially gating said comparison means, and coordinate error signal means connected to said generating means and said detecting and amplifying means for establishing the quadrant position of the received image and for deriving the azimuth and range of the target as represented by said received image, whereby the amplitude of the compared signal between successive signals of said comparison means indicates the radial tracking error and the output from the coordinate error signal means indicates the polar position of said image of the target.

3. A scanning system for a vidicon tracker, comprising in combination:

a vidicon having a phtoconductive plate and an electron gun for producing an electron beam and for directing said beam to said photoconductive plate adapted to receive an image of a target within the field of view of the vidicon, a pair of orthogonal related electron beam deflection means, means for generating deflecting voltages consisting of two sets of voltages wherein voltages of a set are 90° out of phase and voltages between sets have different amplitudes, said sets of voltages being applied alternately to said pair of deflection means so that a double circular scan of the electron beam having both inner and outer rings impinges on the photoconductive plate, synchronizing means connected to said generating means and initiated by said generating means for establishing synch signals coincident with the set of voltages for the scan of inner ring and the scan of outer ring, receiving means for detecting and amplifying a vidicon output signal representing a received image on the photoconductive plate when the electron beam scans said photoconductive plate, comparison means connected to said receiving means and said synchronizing means for separating successive vidicon output signals for each scan of the inner and outer ring, for retaining a vidicon output signal of the scan of the outer ring separate and distinct from the vidicon signal of the scan of the inner ring and for determining the difference between the vidicon output signals between each of the successive scans of the inner and outer rings, whereby amplitude of the difference signal represents radial error of the vidicon tracker, coordinate error signal means connected to said generating means and said receiving means for determining the quadrant position of the image on the photoconductive plate and for deriving from the deflection voltages of said generating means the azimuth and range of the target represented by said image, and output means connected to said comparison means and to said coordinate error signal means for combining the difference signal from said comparison means and the output signal of said coordinate error signal means.

4. A scanning system for a vidicon tracker comprising in combination:

a vidicon having a photoconductive plate and an electron gun for producing an electron beam and for directing said beam to said photoconductive plate adapted to receive an image of a target within the field of view of the vidicon;

a pair of orthogonal related electron beam deflection means;

means for generating deflecting voltages consisting of two sets of voltages wherein voltages of a set of 90° out of phase and voltages between sets have different amplitudes, said sets of voltages being applied alternately to said pair of deflection means so that a double circular scan of the electron beam having both inner and outer rings impinges on the photoconductive plate;

synchronizing means connected to said generating means and initiated by said generating means for establishing synch signals coincident with the set of voltages for the scan of the inner ring and the scan of the outer ring;

receiving means for detecting and amplifying a vidicon output signal representing a received image on the photoconductive plate when the electron beam scans said photoconductive plate;

comparison means having an inner ring gate and an outer ring gate connected to said receiving means and each gate individually connected to said synchronizing means for receiving respectively the inner and outer ring synch signals for sequentially triggering said gates for separating successive vidicon output signals of each completed double circular scan, and hold filter means connected to each of said gates for storing the successive vidicon output signals and summing means connected to said hold filter means for determining a difference output signal between the stored successive vidicon output signals of said hold filter means, said difference output signal having an amplitude representing the radial error of the vidicon tracker;

co-ordinate error signal means connected to said generating means and said receiving means for determining the quadrant position of the image on the photoconductive plate and for deriving from the deflecting voltages of said generating means the azimuth and range of the target represented by said image; and output means connected to summing means and to said coordinate error signal means for combining the difference signal from said summing means and the output signal of said co-ordinate error signal means.

References Cited

UNITED STATES PATENTS

| | | | |
|---|---|---|---|
| 3,039,002 | 6/1962 | Guerth | 250—203 |
| 3,134,902 | 5/1964 | Chase et al. | 250—83.3 |

DAVID J. GALVIN, *Primary Examiner.*